United States Patent [19]

McCarthy et al.

[11] Patent Number: 4,497,602
[45] Date of Patent: Feb. 5, 1985

[54] LOCKING DEVICE

[75] Inventors: Karen McCarthy, Kirkland; Charles R. Prochaska, Auburn, both of Wash.

[73] Assignee: The Boeing Company, Seattle, Wash.

[21] Appl. No.: 472,066

[22] Filed: Mar. 4, 1983

[51] Int. Cl.³ .............................................. B60P 7/08
[52] U.S. Cl. .................................. 410/69; 244/118.1; 410/52
[58] Field of Search ............. 410/52, 69, 70, 77, 410/84; 244/118.1, 137 R; 92/78, 207

[56] References Cited

U.S. PATENT DOCUMENTS

| | | | |
|---|---|---|---|
| 1,792,357 | 2/1931 | Bonner | 410/66 |
| 2,261,789 | 11/1941 | Andersen | 308/51 |
| 2,424,429 | 7/1947 | Bamberg | 414/544 |
| 3,182,608 | 5/1965 | Mollon | 244/137 R X |
| 3,399,921 | 9/1968 | Trost et al. | 410/69 |
| 3,460,792 | 8/1969 | Brenner et al. | 410/69 |
| 3,498,238 | 3/1970 | Sweger | 410/70 |
| 3,604,363 | 9/1971 | Smith | 410/70 |
| 3,604,364 | 9/1971 | Sweger | 410/70 |
| 3,667,401 | 6/1972 | Schwiebert et al. | 410/70 |
| 3,827,375 | 8/1974 | Terlecky et al. | 410/70 |
| 3,984,117 | 10/1976 | Bates et al. | 410/66 |
| 4,109,885 | 8/1978 | Pender | 244/118.1 X |
| 4,114,718 | 9/1978 | Lipshield | 180/89.14 |
| 4,375,932 | 3/1983 | Alberti | 410/69 |

Primary Examiner—Randolph Reese
Attorney, Agent, or Firm—Delbert J. Barnard; Joan H. Pauly

[57] ABSTRACT

A container (4) is restrained from movement in a given direction out from a set position. A restraint member (32) is located at one side of the path of the container (4) and is pivoted by the container (4) when the container (4) is moved into and out from the set position. The restraint member (32) is biased in an unlocked center position. After the container (4) is moved into its set position, the resistraint member (32) is prevented from returning all the way to its unlocked center position and is held in a blocking position by contact between a reciprocating detent (62) and a shoulder (54), one of which is carried by the member (32). The apparatus (2) is unlocked by manually retracting the detent (62) away from the shoulder (54). This allows the restraint member (32) to return to its unlocked center position.

20 Claims, 7 Drawing Figures

LOCKING DEVICE

TECHNICAL FIELD

This invention relates to mechanisms for locking movable bodies in place and, more particularly, to such a mechanism that locks automatically when the body is moved into position, that requires positive effort to be unlocked, and that automatically resets when the body is moved out of engagement with it.

BACKGROUND ART

The present invention is directed primarily toward providing a locking device to restrain a galley waste container from forward motion along a bulk cargo compartment floor that slopes inwardly in the aft direction at an angle of about 8°. Such forward motion would obviously be undesirable since it could cause injury to personnel working in the cargo area and/or property damage to baggage and other cargo stowed forward of the waste container and since it would interfere with the proper functioning of the waste disposal system.

The patent literature includes numerous devices for restraining movement of a movable body. U.S. Pat. No. 1,792,357, granted Feb. 10, 1931, to J. C. Bonner, discloses a restraint mechanism that automatically locks a vehicle in place on a railroad car when the car is moved into position under the vehicle. As the car is being moved into position, a portion of the vehicle engages and pivots a spring loaded locking member, which returns to its original position when the car is in place. U.S. Pat. No. 2,261,789, granted Nov. 4, 1941, to G. R. Andersen, discloses a journal box cover seal that includes a spring loaded reciprocating plunger with a cammed head. When the cover is opened or closed, it engages and retracts the plunger which is then extended by the spring. U.S. Pat. No. 4,114,718, granted Sept. 19, 1978, to E. C. Lipshield, discloses a locking device with a hook that engages a transverse pin. A cam member is hydraulically operated to move the hook between locking, safety and releasing positions.

The following United States patents each disclose a device for restraining cargo:

No. 424,429, granted July 22, 1947, to P. E. Bamberg;
No. 3,399,921, granted Sept. 3, 1968, to P. E. Trost et al;
No. 3,460,792, granted Aug. 12, 1969, to R. P. Brenner et al;
No. 3,498,238, granted Mar. 3, 1970, to T. J. Sweger;
No. 3,604,363, granted Sept. 14, 1971, to E. P. Smith;
No. 3,604,364, granted Sept. 14, 1971, to T. J. Sweger;
No. 3,667,401, granted June 6, 1972, to P. D. Schweibert et al;
No. 3,827,375, granted Aug. 6, 1974, to B. S. Terlecky et al; and
No. 3,984,117, granted Oct. 5, 1976, to J. M. Bates et al.

Brenner et al discloses a latch for restraining vertical movement of a cargo pallet. The latch includes spring biased restraining arms that automatically retract to permit horizontal passage of the pallet.

The other eight patents each disclose a restraining mechanism that has a hooked pivoting member that engages a portion of the body to be restrained. Each of these hooked members automatically moves into position to restrain the body when the body is set into position. Each of the mechanisms appears to automatically reset to receive another body when a movable body is released from the mechanism. Trost et al, Sweger 3,498,238, and Bates et al disclose mechanisms that require manual release before the body can be moved out of position; the mechanism of Bamberg is automatically released when a lifting device is operated to lift the body. The remaining four patents disclose devices in which the body may be moved out of position and out of engagement with the hooked member by exerting a sufficient lifting force.

All of the above-discussed twelve U.S. patents, except Bates et al, include a restraint member that is biased into a particular position. Most of the restraint members are biased into their locking or latching positions. The exceptions are the restraint members disclosed by Bamberg and Trost et al, which are biased in an unlatching position to which the restraint member is returned when the body is lifted out of position. In both cases, the restraint member apparently does not pivot outwardly beyond its biased unlatching position.

The above patents and the prior art that is discussed and/or cited therein should be studied for the purpose of putting the present invention into proper perspective relative to the prior art.

DISCLOSURE OF THE INVENTION

A subject of this invention is apparatus for restraining movement of a movable body in a given direction out from a set position. According to a basic aspect of the invention, the apparatus comprises a restraint member located at one side of the path of the movable body into and out from the set position and mounting means for pivotally mounting the restraint member. Releasable lock means is provided for locking the restraint member into a blocking position in the path of the movable body to prevent unwanted movement of the movable body in said given direction out from its set position. Biasing means bias the restraint member into an unlocked center position in the path of the movable body. This biasing means allows the restraint member to pivot in one direction out from the path of the movable body in response to the body being moved against said member as the body is being moved into its set position, and to pivot in the opposite direction out from the path of the movable body in response to the body being moved against said member as the body is being moved out from its set position. The biasing means operates to pivot the restraint member back into the path of the movable body and into its blocking position following movement of the movable body into its set position.

According to another aspect of the invention, the releasable lock means comprises a retractable detent and catch means, one of which is carried by the restraint member and the other of which is fixed in position adjacent to the restraint member. The detent includes resilient means biasing it in an extended position. The catch means includes a shoulder positioned to contact a side portion of the extended detent to prevent the restraint member from returning to said unlocked position. Preferably, the releasable lock means further comprises a ramp surface that slopes from the outer edge of the shoulder in a direction generally away from the detent. This ramp surface is positioned to contact and retract the detent upon pivotal movement of the restraint member out of its center position in response to said body being moved into its set position. In the preferred embodiment, the restraint member includes a concentric arcuate groove into which the detent is received. The shoulder and the ramp surface are positioned within this groove, and the groove includes an inner surface portion extending from the inner edge of the shoulder generally away from the ramp surface and substantially perpendicularly to the direction of reciprocation of the detent.

According to another aspect of the invention, the releasable lock means includes release means for unlocking the lock means to allow the restraint member to be returned to its unlocked center position by the biasing means and the body to be moved out from its set position. Preferably, after the restraint member has pivoted in said opposite direction in response to the body being moved out from its set position and after the body has cleared the restraint member, the biasing means returns the restraint member to its center position to automatically reset the apparatus to receive and restrain a movable body. Also preferably, the release means comprises handle means for manually retracting the detent away from the catch means.

According to still another aspect of the invention, the side portion of the extended detent contacted by the shoulder forms a frictional mating surface. This mating surface is sufficiently large so that, when the movable body has at least a predetermined minimum weight and is moved into its set position up a slope of a predetermined magnitude and restrained therein by the apparatus and the force of gravity urges the body against the restraint member and the mating surface against the shoulder, the frictional force between the mating surface and the shoulder is sufficient to require an operator to push the body away from the restraint member before operating the release means to retract the detent. The major advantage of this feature of the invention is that it minimizes danger to the personal safety of an operator who is moving the movable body out of position. Since the operator must first push against the body to oppose the tendency of the body to move toward the operator under the force of gravity, the danger of the body unexpectedly moving toward the operator and injuring the operator when the release means is operated is essentially eliminated.

According to another basic aspect of the invention, the apparatus comprises a restraint member located at one side of the path of the movable body into and out from its set position and mounting means for pivotally mounting the restraint member. Releasable lock means lock the restraint member into a blocking position in the path of the movable body to prevent unwanted movement of the movable body in said given direction out from its set position. The lock means includes a retractable detent and catch means, one of which is carried by the restraint member and the other of which is fixed in position adjacent to the restraint member. The detent includes resilient means biasing it in an extended position. The catch means includes a shoulder positioned to contact a side portion of the extended detent when the restraint member is in its blocking position. Biasing means bias the restraint member into a position in the path of the movable body. When the movable body is being moved into its set position and against the restraint member, the restraint member pivots in response against the force of the biasing means and out from the path of the movable body. When the movable body reaches its set position, the biasing means pivots the restraint member back into the path of the movable body and into its blocking position.

Another subject of this invention is apparatus for restraining movement of a cargo unit or the like in a given direction out from a set position. According to a basic aspect of the invention, this apparatus comprises a restraint member located at one side of the path of the cargo unit into and out from the set position and mounting means for pivotally mounting the restraint member. Releasable lock means lock the restraint member into a blocking position in the path of the cargo unit to prevent unwanted movement of the cargo unit in said given direction out from its set position. Biasing means bias the restraint member into an unlocked center position in the path of the cargo unit. The biasing means allows the restraint member to pivot in one direction out from the path of the cargo unit in response to the unit being pushed against said member as the unit is being pushed into its set position, and to pivot in the opposite direction out from the path of the cargo unit in response to the unit being moved against said member as the unit is being moved out from its set position. The biasing means operates to pivot the restraint member back into the path of the cargo unit and into its blocking position following movement of the unit into its set position.

Still another subject of this invention is apparatus for restraining movement of a container or the like in a given direction out from a set position in a system in which the container is supported on a cargo compartment floor of an aircraft which slopes downwardly in a given direction. According to a basic aspect of the invention, this apparatus comprises a restraint member located at one side of the path of the container into and out from the set position and mounting means for pivotally mounting the restraint member. Releasable lock means lock the restraint member into a blocking position in the path of the container to prevent unwanted movement of the container in said given direction out from its set position. Biasing means is provided for biasing the restraint member into an unlocked center position in the path of the container. This biasing means allows the restraint member to pivot in one direction out from the path of the container in response to the container being pushed against said member as the container is being pushed into its set position, and to pivot in the opposite direction out from the path of the container in response to the container being moved against said member as the container is being moved out from its set position. The biasing means operates to pivot the restraint member back into the path of the container and into its blocking position following movement of the container into its set position.

According to a preferred aspect of the invention, the releasable lock means comprises a retractable detent and catch means and further comprises auxiliary lock means for locking the restraint member in its blocking position in the event of a malfunction of the detent and catch means. The auxiliary lock means includes an opening in the restraint member adapted to be aligned with an opening in an adjacent fixed structure for receiving lock pin means to prevent movement of the restraint member relative to said fixed structure. This feature of auxiliary lock means is particularly important in an aircraft environment since in its absence a malfunction of the primary lock means could prevent an aircraft from being approved for departure until the apparatus is repaired or replaced. The result would be needless schedule delays and additional expense. The provision of the auxiliary lock means permits the deferral of replacement or repair of the apparatus until a regularly scheduled maintenance period.

The automatic locking feature of apparatus constructed according to the invention helps to insure the smooth functioning of the waste disposal system and greatly reduces the chances of personal injury and/or property damage resulting from unwanted movement of a waste container or other movable body out from a set position. All that is required to lock the container in position is that the container be moved into position. Therefore, there is no locking operation which the operator might forget to perform and human error is largely eliminated from the installation process.

A number of the preferred features of the invention also help to minimize the danger of personal injury and/or property damage. The automatic reset feature eliminates the need for human intervention to reset the apparatus and therefore eliminates the danger of human forgetfulness. The combination of the automatic locking and the automatic reset features makes the locking of the container in position practically foolproof. The manual release feature helps prevent the accidental disengagement of the apparatus. The retractable detent and shoulder catch structure also helps to prevent accidental disengagement. The effectiveness of these features in preventing accidental disengagement is even greater when the container must be pushed away from the restraint member before the detent can be manually retracted.

In addition to being safe to operate, apparatus constructed according to the invention is easy to operate. This results in significant savings in worker time and effort.

Apparatus constructed according to the invention has further advantages, including being relatively easy and inexpensive to manufacture and to maintain. In addition, the apparatus may be constructed as a self-contained unit that need only be fastened to the cargo compartment floor or other ground surface. This reduces the cost of installing the apparatus and enhances the versatility of the apparatus since it may be installed in almost any environment in which movement of a movable body needs to be restrained. Other advantages of the preferred construction are that it provides a durable restraint mechanism that resists the accumulation of water and other contaminants that might present a risk of corrosion.

These and other advantages and features will become apparent from the detailed description of the best mode for carrying out the invention that follows.

BRIEF DESCRIPTION OF THE DRAWINGS

In the drawings, like element designations refer to like parts throughout, and.

BEST MODE FOR CARRYING OUT THE INVENTION

Figure 7:
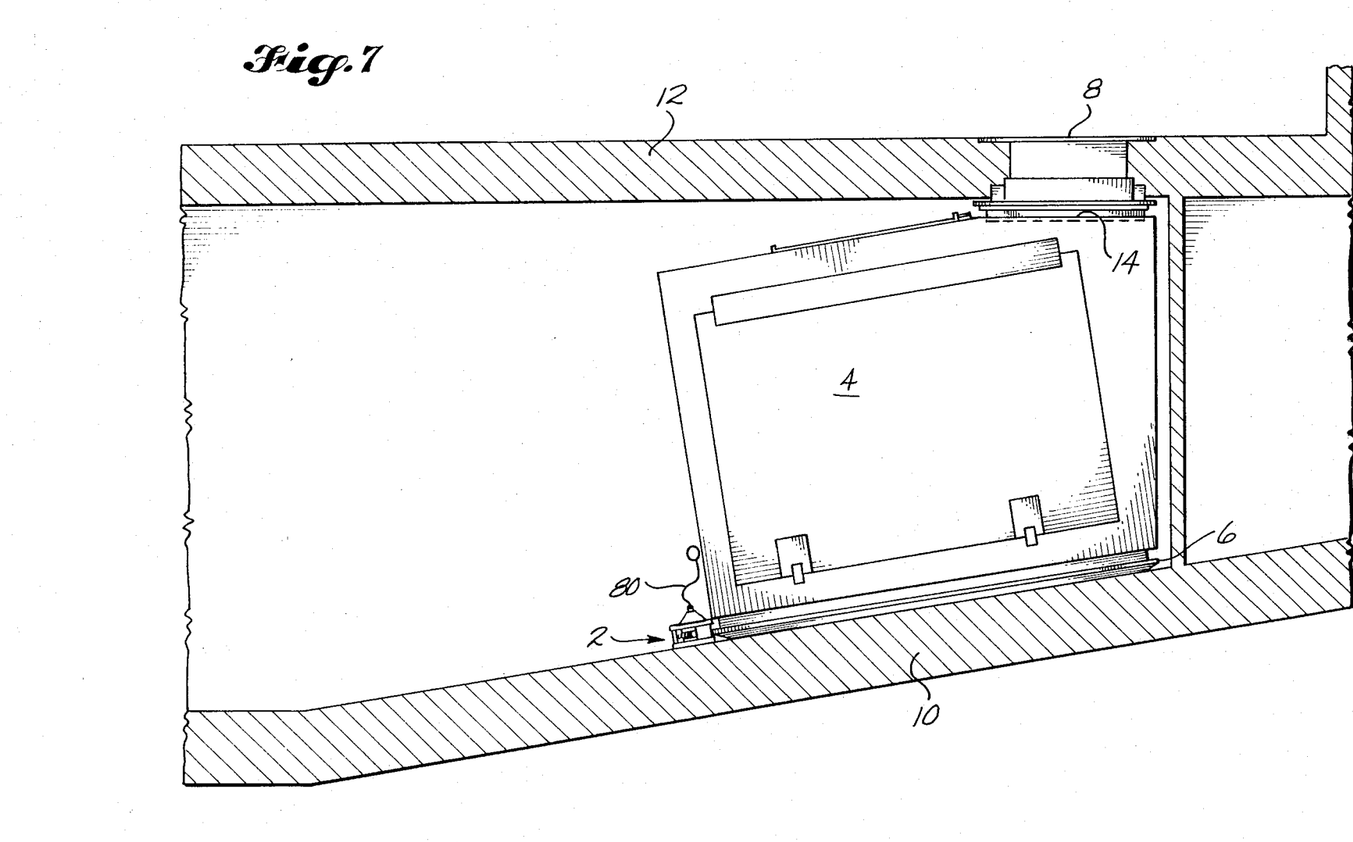
FIG. 7 is a vertical sectional view of the aft portion of an aircraft cargo compartment in which the preferred embodiment of the apparatus of the invention is in use to restrain forward movement of a waste container.

The drawings show restraint apparatus 2 that is constructed according to the invention and that also constitutes the best mode of the invention currently known to the applicant. FIG. 7 illustrates the anticipated primary use for the apparatus of the invention. In FIG. 7, the apparatus 2 is shown restraining forward movement of a galley waste container 4 that is positioned in the aft portion of an aircraft cargo compartment. The cargo compartment illustrated is the bulk cargo compartment of the aircraft and has a floor 10 that slopes upwardly in the aft direction at an angle of about 8°. The waste container 4 is part of the waste disposal system of the aircraft. Waste from the aft galley of the aircraft is deposited in a conduit (not shown) that communicates with an opening 8 in the floor 12 of the galley. The opening 8 communicates with an opening 14 in the waste container 4. At the end of a flight the waste container 4 is removed to be emptied or to be replaced. Since waste containers such as the container 4 shown in FIG. 7 are quite heavy, weighing in the order of 200 pounds empty and 600 pounds full, reliable restraint of the container from forward motion is very important in order to maintain the safety of personnel and property.

As shown in the drawings, the preferred embodiment of the restraint apparatus 2 includes a housing 20 which has a top wall 22 and a bottom wall 24 connected by a sidewall 26. The sidewall 26 extends around the housing from a mid portion of one of the sides, around the back of the housing, to a mid portion of the other side. The housing 20 is open between the top and bottom walls 22, 24 at the front of the housing and the front portions of the sides of the housing 20. In other words, a slot 28 extends across the front portion of the sidewall 26. The bottom wall 24 has two rearwardly extending projections 29, 30 that serve as means for mounting the apparatus 2 to the floor 10 of the cargo compartment. As shown in the drawings, the apparatus 2 may be mounted by means of bolts 31.

In the preferred embodiment, a generally horizontal pear-shaped restraint member 32 is pivotally mounted on the housing 20. The restraint member 32 is mounted on a pivot pin 34, the two ends of which are pivotally received into suitable openings in the top and bottom walls 22, 24 of the housing 20, respectively. A lock pin 48 secures the restraint member 32 to its pivot pin 34. The lock pin 48 is closely received into lateral openings extending through the restraint member 32 and pivot pin 34 so that member 32 and pin 34 pivot together and member 32 is maintained in its correct vertical position with respect to top and bottom walls 22, 24. The smaller tapered end of the restraint member 32 extends into the housing 20 between the two side portions of the sidewall 26, and the wider end of the restraint member 32 is positioned within the slot 28.

Figure 1:
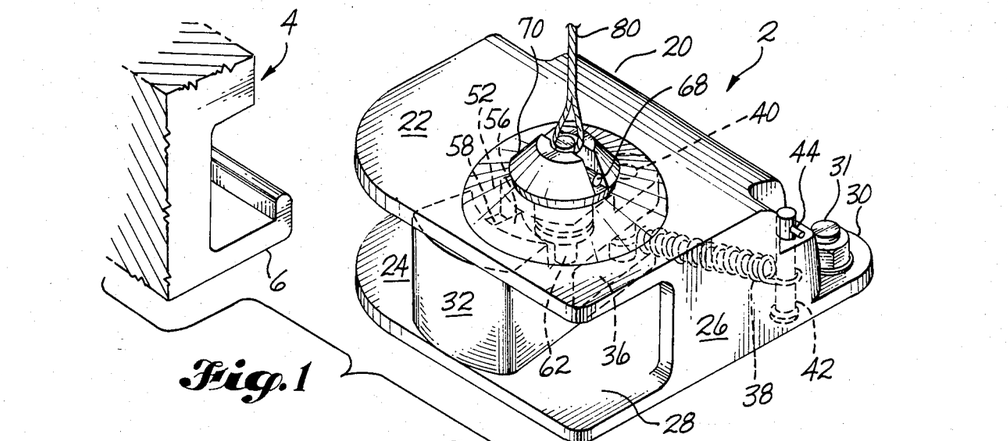
FIG. 1 is a pictorial view of the preferred embodiment of the apparatus of the invention (with the restraint member in its center position) and a lip portion of a container moving towards engagement with the apparatus.
Figure 2:
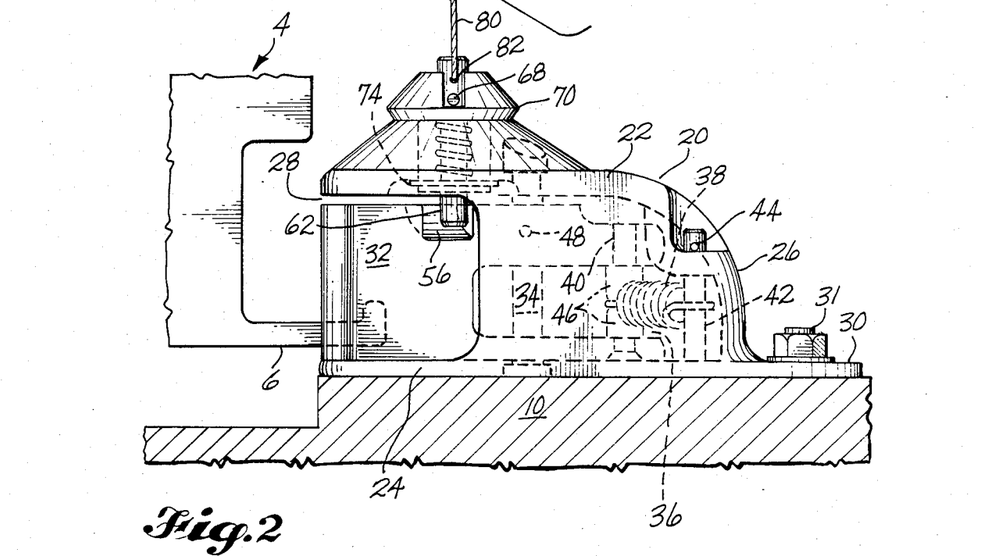
FIG. 2 is a side elevational view of the apparatus and container lip shown in FIG. 1, including a portion of the cargo compartment floor.
Figure 3:
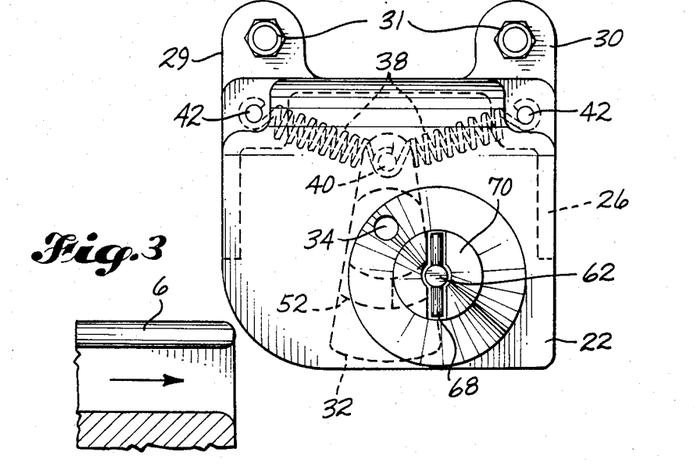
FIG. 3 is a simplified top plan view of the apparatus and container lip shown in FIG. 1.

Two coil springs 38 of equal strength bias the restraint member 32 into a center position between the two sides of the housing 20. This position is shown in FIGS. 1, 2, and 3. The outer end of each spring 38 is mounted to a rear corner portion of the housing 20, and the inner end is mounted on a center pin 40 carried by the tapered end of the restraint member 32 rearward of the pivot pin 34. A mounting pin 42 is positioned at each rear corner of the housing 20 for mounting the outer ends of the springs 38. Each mounting pin 42 has a head at one end that is received into a corresponding recess in the bottom wall 24 of the housing 20 and a hole at the other end that receives a lock pin 44 that secures the mounting pin 42 in place. The restraint member 32 has a slot 36 extending laterally therethrough at its tapered end for accommodating the inner ends of the two springs 38. The pin 40 to which the inner ends of the springs 38 are mounted extends vertically through a rear portion of the tapered end of the restraint member 32 and the slot 36. Two bushings 46 provide vertical centering of the springs 38 on pin 40.

The top surface of the restraint member 32 has a concentric arcuate groove 52 that includes (from left to right as shown in the drawings) a horizontal inner surface 58, a vertical shoulder 54, and a ramp surface 56 that slopes downwardly from the outer edge of the shoulder 54 to the right edge of the groove 52 and the restraint member 32. The inner surface 58 extends from the left edge of the groove 52 and the restraint member 32 to the inner or lower edge of the shoulder 54. It should be noted that in this description that the terms "inner" and "outer" in reference to the structure of the groove 52 are intended to indicate the inward or outward position relative to the groove and the top surface of the restraint member 32 bordering the groove 52.

Figure 6:
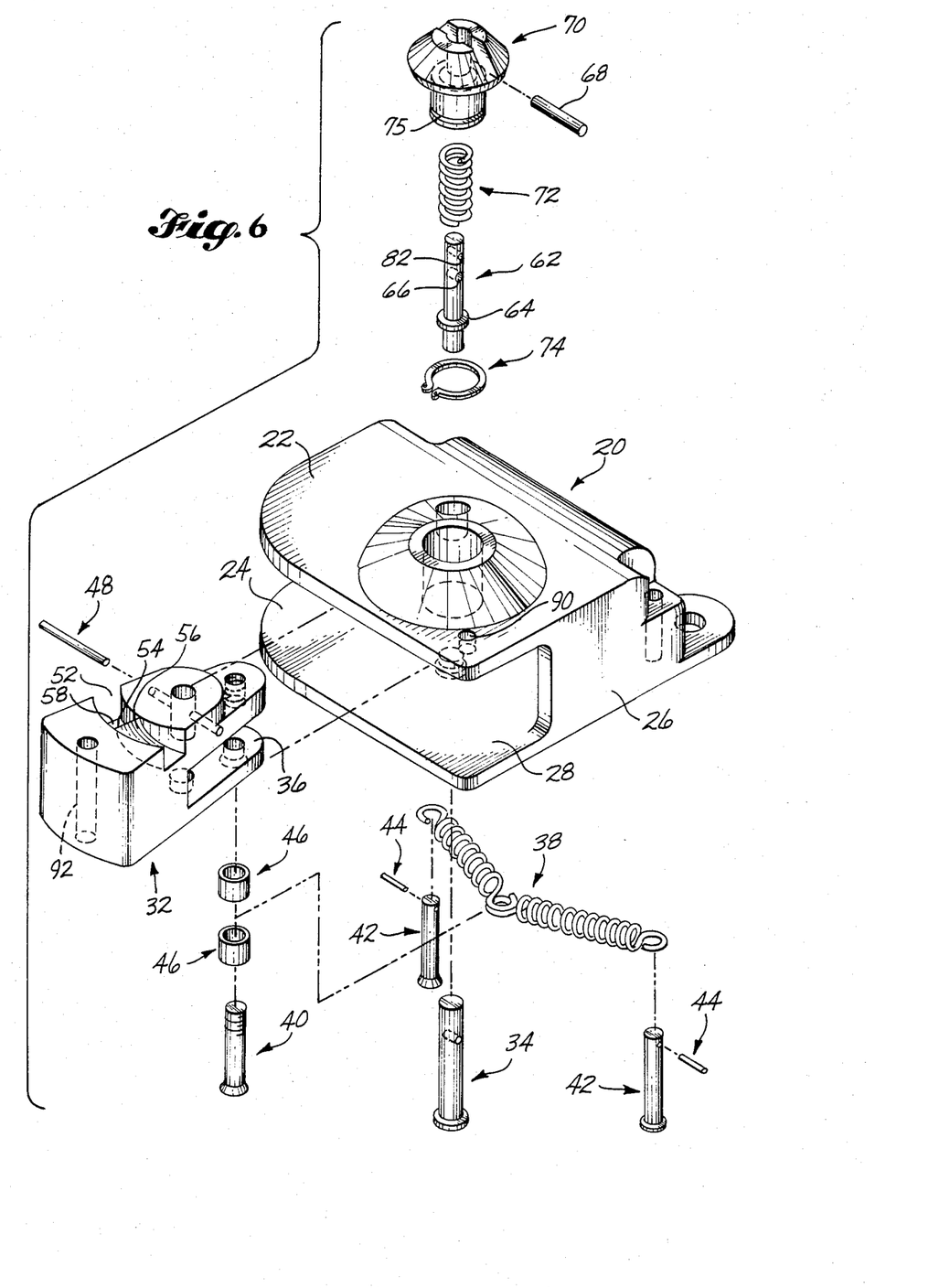
FIG. 6 is an exploded pictorial view of the preferred embodiment of the apparatus of the invention.

A reciprocating pin or detent 62 is mounted to the top of the housing 20 to cooperate with the ramped groove structure of the restraint member 32 to provide a means for locking the restraint member 32 in place. The detent 62 has a basically cylindrical body with a circumferential flange 64 around a lower portion thereof. A compression coil spring 72 surrounds the upper portion of the detent 62 with one end urged against the flange 64. The detent 62 and the spring 72 are received into a bushing 70 that has a head against which the other end of the spring 72 is urged. The bottom of the detent 62 extends downwardly out of the bushing 70. The top of the detent 62 extends upwardly out through the head of the bushing 70 and is secured against excessive downward motion by a lock pin 68. The lock pin 68 is received into a lateral slot in the head of the bushing 70 and through a hole 66 that extends radially through an upper portion of the shaft or body of the detent 62. The bushing 70 is secured to the top of the housing 20. The force of the spring 72 compressed between the flange 64 and the head of the bushing 70 biases the detent 62 in a downward direction toward the groove 52 in the restraint member 32. Preferably, a retainer, such as the split ring retainer 74 shown in FIGS. 2 and 6, is positioned in a recess in the domed top of the housing 20 and engages an annular groove 75 at the bottom of the bushing 70 to secure the connection between the housing 20 and the bushing 70.

In the preferred embodiment, means are provided for unlocking the apparatus 2 by manually retracting the detent 62 away from the restraint member 32. As shown in the drawings, such means may take the form of a strap 80 with a lower loop that engages a hole 82 in the top end of the detent 62. The upper end of the strap may be attached to the cargo compartment sidewall (FIG. 7) to ensure that the strap 80 is always in easy reach of the operator. This unlocking arrangement has the advantages of simplicity, ease of operation, and flexibility. However, the unlocking means could also take any of a large number of other forms without departing from the spirit and scope of the invention. Such alternative forms include various manual, mechanical, and electrical unlocking arrangements.

The operation of the apparatus 2 is shown in FIGS. 1-5. The apparatus 2 is mounted to the cargo compartment floor 10 at one side of the path of the waste container into and out from its set use position. The path of a horizontal lip 6 on the bottom of the container 4 overlaps the housing 20 of the restraint apparatus 2 so that lip 6 enters slot 28 and contacts restraint member 32 when the container 4 is being moved into or out from its use position. The restraint member 32 is biased by the springs 38 into its unlocked center position (FIGS. 1-3), and the restraint member 32 reassumes this position unless the detent 62 is engaged by the catch or shoulder 54 to lock the restraint member into its blocking position shown in solid lines in FIG. 5 (or unless the auxiliary lock means described below is put into operation).

Figures 4, 5:
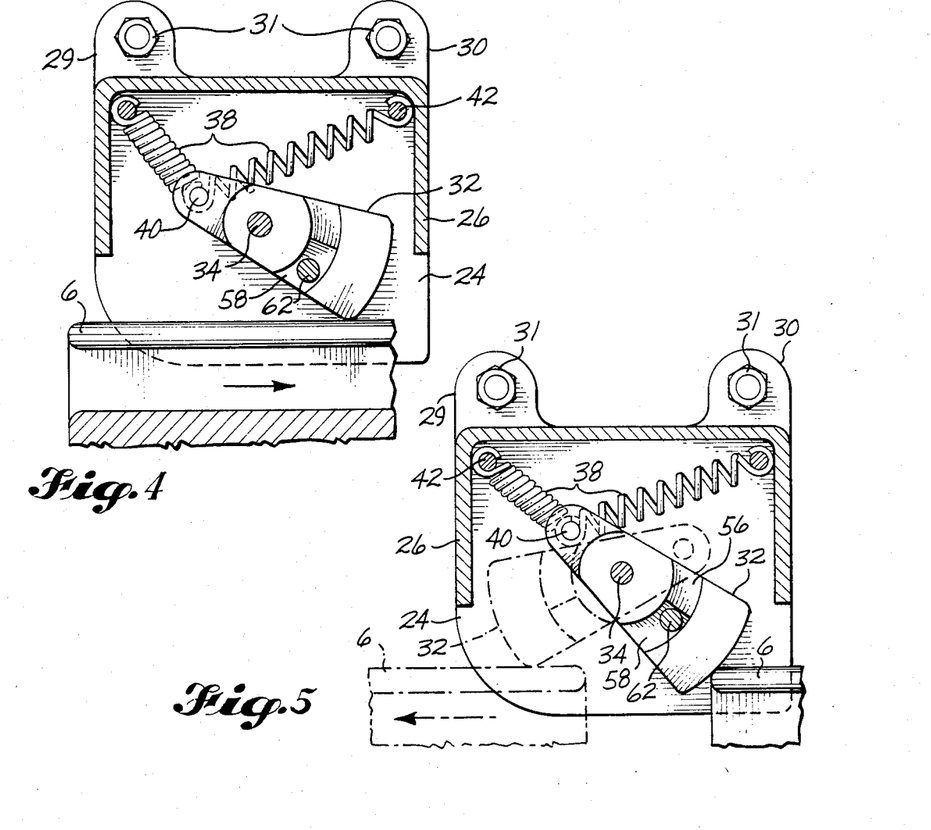
FIG. 4 is like FIG. 3 except that some parts of the apparatus are shown in section and the container lip is in a position in which it has engaged the restraint member and pivoted the restraint member all the way inwardly beyond the blocking position.
FIG. 5 is similar to FIG. 4 except that it shows, in solid lines, the blocking position of the restraint member and the set position of the container, and in broken lines the positions of the restraint member and the container lip just before the container lip is moved all the way out from engagement with the restraint member.

With the restraint member 32 in its unlocked center position, the container 4 is installed into its use position indicated in solid lines in FIG. 5 and shown in FIG. 7. As the container 4 is moved toward its use position, the lip 6 is moved against the restraint member 32 which in response pivots in the counterclockwise direction (as shown) and out from the path of the container 4. FIGS. 1-3 show the container 4 being moved towards the restraint member 32, and FIG. 4 shows the restraint member 32 pivoted all the way counterclockwise out of the path of the container 4.

When the restraint member moves from the position shown in FIG. 3 to the position shown in FIG. 4, the detent 62 is contacted by the ramp surface 56, causing the detent 62 to be retracted. When the shoulder 54 moves past the detent 62, the spring 72 causes the detent 62 to resume its extended position. Further counterclockwise movement of the restraint member 32 is unhindered since the detent 62 is aligned with the inner surface 58 of the groove 52, which inner surface clears the detent 62. Throughout this motion, the sidewalls of the groove 52 act as a guide for the detent 62.

When the container 4 has reached its use position, the springs 38 cause the restraint member 32 to pivot back in the opposite direction (the clockwise direction as shown in the drawings) until the shoulder 54 contacts a side portion of the extended detent 62. The contact between the shoulder 54 and the detent 62 prevents the restraint member 32 from moving back into its unlocked center position and holds the restraint member 32 in its blocking position shown in solid lines in FIG. 5. As is clearly shown in FIG. 5, the restraint member 32 is in the path of the container 4 when it is in its blocking position and, thus, the restraint member 32 prevents forward movement of the container 4 out from its use position. Aft movement and lateral and vertical movement are prevented by other devices not a part of the present invention and therefore not shown or described herein.

When it is desired to remove the container for emptying or replacement, the operator retracts the detent 62 by pulling the strap 80. This releases the restraint member 32 and allows the springs 38 to return the restraint member 32 to its unlocked center position. The operator then slides the container 4 out from its use position. As the container 4 is moving out of its use position, the lip 6 is moved against the restraint member 32, causing the restraint member 32 to pivot in the opposite (clockwise) direction out from the path of the container 4. FIG. 5 shows in broken lines the positions of the restraint member 32 and the container 4 when the container 4 is being moved out from its use position and the restraint member 32 has pivoted all the way clockwise out of the path of the container 4. Once the container 4 clears the restraint member 32, the springs 38 return the restraint member 32 to its unlocked center position thereby automatically resetting the restraint apparatus 2 for receiving a container to be restrained.

When the restraint apparatus of the invention is used in a situation such as that shown in FIG. 7, i.e. a situation in which a container or the like is restrained from motion down a sloped surface, the apparatus of the invention is preferably provided with an additional feature. This feature is the positioning of the pivotal axis of the restraint member 32 to provide at least a minimum desired frictional force between the shoulder 54 and the detent 62 for a given container weight and slope angle. In an installation like that shown in FIG. 7, the force of gravity urges the container 4 against the restraint member 32 and the shoulder 54 against the frictional mating surface formed by the side portion of the extended detent 62 contacted by the shoulder 54. The result is that the operator is required to push the container 4 away from the restraint member 32 before pulling the strap 80 to retract the detent 62. As discussed above, this feature helps to insure the personal safety of the operator.

It should be obvious that the advantages of the last-described feature are obtained at the expense of additional wear of the detent 62. In order to minimize such wear, it is desirable to limit the load experienced by the extended detent 62 to the minimum level necessary to maintain such last-described feature. This can be done by adjusting the load path (which is normal to the point of contact between restraint member 32 and container 4) to pass through pivot pin 34 near the longitudinal axis of pin 34. The nearer the load path is to such axis, the greater the load on pin 34 and the smaller the load on detent 62. The load experienced by pin 34 is transmitted to housing 20 by contact between the ends of pin 34 and the sidewalls of holes in housing top and bottom walls 22, 24 into which the pin ends are received.

The restraint apparatus is preferably provided with auxiliary lock means for locking the restraint member 32 in its blocking position in the event of a malfunction of the detent and catch means. In the preferred embodiment shown in the drawings, the auxiliary lock means includes a vertical opening 92 extending through the wider end of the restraint member 32. This opening 92 is aligned with a vertical opening 90 in the adjacent top wall 22 of the housing 20. To put the auxiliary lock means into operation, a lock pin (not shown) is inserted through the two openings 90, 92 to prevent movement of the restraint member 32 relative to the housing 20.

In the situation shown and described herein, the waste container 4 is restrained from forward movement by the restraint apparatus 2 and from movement in all other directions by other means. In other situations, it might be desirable to allow movement of the body being restrained in some or all directions other than the given direction in which movement is restrained by apparatus constructed according to the invention. The apparatus of the invention is highly versatile and may be used in a wide variety of situations involving various degrees of restraint.

The drawings show the restraint apparatus 2 being used to restrain a waste container that is essentially rectangular. The illustration of this use is not intended to limit the application of the apparatus of the invention, and it is intended to be understood that the apparatus of the invention may be used to advantage to restrain a very wide variety of movable bodies of various shapes. For example, the apparatus could be used to restrain a body with a U-shaped cross section in an application in which only one leg of the U, as opposed to the entire body, is moved past the restraint member 32. Whatever the type and shape of the movable body, the body may, of course, be either entirely separate from the restraint apparatus or a movable part of the same structure into which the apparatus of the invention is incorporated.

Throughout the description of the structure and operation of the preferred embodiment of the apparatus of the invention, the terms "horizontal" and "vertical" and the phrase "at one side of the path" and the like have been used. Such terms and phrases have been used for illustrative purposes only, illustrating a typical orientation of the apparatus. The phrases are not intended to indicate that the apparatus is limited to being used in an orientation in which it is horizontally adjacent to the path of the movable body, and it is intended to be understood that the apparatus of this invention can be used to advantage in other orientations, including one in which the apparatus is vertically adjacent to the path of the movable body. In other words, the word "side" in phrases like "at one side of the path" is intended to be interpreted in its broadest sense to include any portion of the path essentially parallel to the direction of motion.

It will be obvious to those skilled in the art to which this invention is addressed that the invention may be used to advantage in a variety of situations. Therefore, it is also to be understood by those skilled in the art that various changes, modifications, and omissions in form and detail may be made without departing from the spirit and scope of the present invention as defined by the following claims.

What is claimed is:

1. Apparatus for restraining movement of a movable body in a given direction along a path out from a set position, comprising:

a restraint member located at one side of the path of the movable body;

mounting means for pivotally mounting the restraint member;

releasable lock means for locking the restraint member into a blocking position in the path of the movable body to prevent unwanted movement of the movable body in said given direction out from its set position; and biasing means for biasing the restraint member into an unlocked center position in the path of the movable body; said biasing means allowing the restraint member to pivot in one direction out from the path of the movable body in response to the body being moved against said member as the body is being moved into its set position, and to pivot in the opposite direction out from the path of the movable body in response to the body being moved against said member as the body is being moved out from its set position; and said biasing means operating to pivot the restraint member back into the path of the movable body and into its blocking position following movement of the body into its set position.

2. Apparatus as described in claim 1, in which said releasable lock means comprises a retractable detent and catch means, one of which is carried by the restraint member and the other of which is fixed in position adjacent to the restraint member; said detent including resilient means biasing it in an extended position; and said catch means including a shoulder positioned to contact a side portion of the extended detent to prevent the restraint member from returning to said unlocked position.

3. Apparatus as described in claim 2, in which said releasable lock means further comprises a ramp surface that slopes from the outer edge of the shoulder in a direction generally away from the detent, said ramp surface being positioned to contact and retract the detent upon pivotal movement of the restraint member out of its center position in response to said body being moved into its set position.

4. Apparatus as described in claim 3, wherein the restraint member includes a concentric arcuate groove into which the detent is received; said shoulder and said ramp surface being positioned within said groove; and said groove including an inner surface portion extending from the inner edge of the shoulder generally away from the ramp surface and substantially perpendicularly to the direction of reciprocation of the detent.

5. Apparatus as described in claim 2, in which the releasable lock means includes release means for unlocking the lock means to allow the restraint member to be returned to said unlocked center position by the biasing means and the body to be moved out from its set position, said release means comprising means for manually retracting the detent away from the catch means.

6. Apparatus as described in claim 5, in which the side portion of the extended detent contacted by the shoulder forms a frictional mating surface and the pivotal axis of the restraint member is positioned so that, when said body has at least a predetermined minimum weight and is moved into its set position up a slope of a predetermined magnitude and restrained therein by the apparatus, the force of gravity urges said body against the restraint member and said mating surface against the shoulder and the frictional force between said mating surface and the shoulder is sufficient to require an operator to push said body away from the restraint member before operating the release means to retract the detent.

7. Apparatus as described in claim 1, wherein the releasable lock means includes release means for unlocking the lock means to allow the restraint member to be returned to said unlocked center position by the biasing means and the body to be moved out from its set position; and wherein, after the restraint member has pivoted in said opposite direction in response to the body being moved out from its set position and after the body has cleared the restraint member, the biasing means returns the restraint member to said center position to automatically reset the apparatus to receive and restrain a movable body.

8. Apparatus for restraining movement of a movable body in a given direction along a path out from a set position, comprising:
a restraint member located at one side of the path of the movable body;
mounting means for pivotally mounting the restraint member;
releasable lock means for locking the restraint member into a blocking position in the path of the movable body to prevent unwanted movement of the movable body in said given direction out from its set position; said lock means including a retractable detent and catch means, one of which is carried by the restraint member and the other of which is fixed in position adjacent to the restraint member; said detent including resilient means biasing it in an extended position; and said catch means including a shoulder positioned to contact a side portion of the extended detent when the restraint member is in its blocking position; and
biasing means for biasing the restraint member into a position in the path of the movable body;
wherein when the movable body is being moved into its set position and against the restraint member, the restraint member pivots in response against the force of the biasing means and out from the path of the movable body; and when the movable body reaches its set position, the biasing means pivots the restraint member back into the path of the movable body and into its blocking position.

9. Apparatus as described in claim 8, in which said releasable lock means further comprises a ramp surface that slopes from the outer edge of the shoulder in a direction generally away from the detent, said ramp surface being positioned to contact and retract the detent upon pivotal movement of the restraint member in response to said body being moved against the restraint member toward its set position.

10. Apparatus as described in claim 9, wherein the restraint member includes a concentric arcuate groove into which the detent is received; said shoulder and said ramp surface being positioned within said groove; and said groove including an inner surface portion extending from the inner edge of the shoulder generally away from the ramp surface and substantially perpendicularly to the direction of reciprocation of the detent.

11. Apparatus for restraining movement of a cargo unit or the like in a given direction along a path out from a set position, comprising:
a restraint member located at one side of the path of the cargo unit;
mounting means for pivotally mounting the restraint member;
releasable lock means for locking the restraint member into a blocking position in the path of the cargo unit to prevent unwanted movement of the cargo unit in said given direction out from its set position; and
biasing means for biasing the restraint member into an unlocked center position in the path of the cargo unit; said biasing means allowing the restraint member to pivot in one direction out from the path of the cargo unit in response to the unit being pushed against said member as the unit is being pushed into its set position, and to pivot in the opposite direction out from the path of the cargo unit in response to the unit being moved against said member as the unit is being moved out from its set position; and said biasing means operating to pivot the restraint member back into the path of the cargo unit and into its blocking position following movement of the unit into its set position.

12. Apparatus as described in claim 11, in which said releasable lock means comprises a retractable detent and catch means, one of which is carried by the restraint member and the other of which is fixed in position adjacent to the restraint member; said detent including resilient means biasing it in an extended position; and said catch means including a shoulder positioned to contact a side portion of the extended detent to prevent the restraint member from returning to said unlocked position.

13. Apparatus as described in claim 12, in which the releasable lock means includes release means for unlocking the lock means to allow the restraint member to be returned to said unlocked center position by the biasing means and the unit to be moved out from its set position, said release means comprising means for manually retracting the detent away from the catch means.

14. Apparatus as described in claim 11, wherein the releasable lock means includes release means for unlocking the lock means to allow the restraint member to be returned to said unlocked center position by the biasing means and the unit to be moved out from its set position; and wherein, after the restraint member has pivoted in said opposite direction in response to the unit being moved out from its set position and after the unit has cleared the restraint member, the biasing means returns the restraint member to said center position to automatically reset the apparatus to receive and restrain a cargo unit.

15. In a system in which a container or the like is supported on a cargo compartment floor of an aircraft, which floor slopes downwardly in a given direction, apparatus for restraining movement of said container in said given direction along a path out from a set position, comprising:
    a restraint member located at one side of the path of the container;
    mounting means for pivotally mounting the restraint member;
    releasable lock means for locking the restraint member into a blocking position in the path of the container to prevent unwanted movement of the container in said given direction out from its set position; and
    biasing means for biasing the restraint member into an unlocked center position in the path of the container; said biasing means allowing the restraint member to pivot in one direction out from the path of the container in response to the container being pushed against said member as the container is being pushed into its set position; and to pivot in the opposite direction out from the path of the container in response to the container being moved against said member as the container is being moved out from its set position; and said biasing means operating to pivot the restraint member back into the path of the container and into its blocking position following movement of the container into its set position.

16. Apparatus as described in claim 15, in which said releasable lock means comprises a retractable detent and catch means, one of which is carried by the restraint member and the other of which is fixed in position adjacent to the restraint member; said detent including resilient means biasing it in an extended position; and said catch means including a shoulder positioned to contact a side portion of the extended detent to prevent the restraint member from returning to said unlocked position.

17. Apparatus as described in claim 16, in which the releasable lock means includes release means for unlocking the lock means to allow the restraint member to be returned to said unlocked center position by the biasing means and the container to be moved out from its set position, said release means comprising means for manually retracting the detent away from the catch means.

18. Apparatus as described in claim 17, in which the side portion of the extended detent contacted by the shoulder forms a frictional mating surface and the pivotal axis of the restraint member is positioned so that, when said container has at least a predetermined minimum weight and is moved into its set position up a slope of a predetermined magnitude and restrained therein by the apparatus, the force of gravity urges said container against the restraint member and said mating surface against the shoulder and the frictional force between said mating surface and the shoulder is sufficient to require an operator to push said container away from the restraint member before operating the release means to retract the detent.

19. Apparatus as described in claim 16, in which the releasable lock means further comprises auxiliary lock means for locking the restraint member in its blocking position in the event of a malfunction of the detent and catch means, said auxiliary lock means including an opening in the restraint member adapted to be aligned with an opening in an adjacent fixed structure for receiving lock pin means to prevent movement of the restraint member relative to said fixed structure.

20. Apparatus as described in claim 15, wherein the releasable lock means includes release means for unlocking the lock means to allow the restraint member to be returned to said unlocked center position by the biasing means and the container to be moved out from its set position; and wherein, after the restraint member has pivoted in said opposite direction in response to the container being moved out from its set position and after the container has cleared the restraint member, the biasing means returns the restraint member to said center position to automatically reset the apparatus to receive and restrain a container.

* * * * *